US006700284B2

(12) United States Patent
Williams et al.

(10) Patent No.: US 6,700,284 B2
(45) Date of Patent: Mar. 2, 2004

(54) FAN ASSEMBLY INCLUDING A SEGMENTED STATOR SWITCHED RELUCTANCE FAN MOTOR

(75) Inventors: Donald J. Williams, Pierron, IL (US); Steven P. Randall, Adel (GB); Craig E. Wallace, Brighton, IL (US)

(73) Assignee: Emerson Electric Co., St. Louis, MO (US)

( * ) Notice: Subject to any disclaimer, the term of this patent is extended or adjusted under 35 U.S.C. 154(b) by 10 days.

(21) Appl. No.: 09/817,560

(22) Filed: Mar. 26, 2001

(65) Prior Publication Data

US 2002/0135255 A1 Sep. 26, 2002

(51) Int. Cl.[7] .................................................. H02K 1/00
(52) U.S. Cl. ........................................ 310/216; 310/259
(58) Field of Search ............................... 310/166, 68 B, 310/216–218, 254, 258, 259

(56) References Cited

U.S. PATENT DOCUMENTS

| 1,756,672 A | 4/1930 | Barr ........................... 310/214 |
| 2,688,103 A | 8/1954 | Sheldon ....................... 310/214 |

(List continued on next page.)

FOREIGN PATENT DOCUMENTS

| DE | 2937838 A | 4/1981 |
| EP | 0350429 | 1/1990 |
| EP | 0823711 A1 | 2/1998 |
| EP | 0778660 A3 | 9/1998 |
| EP | 0868010 A1 | 9/1998 |
| EP | 0871282 A1 | 10/1998 |

(List continued on next page.)

OTHER PUBLICATIONS

G. Gallegos–Lopez, P.C. Kjaer, T.J.E. Miller, "A New Rotor Position Estimation Method For Switched Reluctance Motors Using PWM Voltage Control", in Proc EPE'97, 7th European Conf. on Power Electronics and Applications Sep. 8–10, 1997 Trondheim Norway vol. 3 pp. 580–585.

Stephenson/Blake, "The Characteristics, Design and Aplications of Switched Reluctance Motors and Drives", presented at the PCIM '93 Conference and Exhibition at Nuremburg, Germany, Jun. 21–24, 1993.

T.J.E. Miller, "Switched Reluctance Motors and Their Control", Magna Physics Publishing and Claredon Press Oxford 1993.

WF Ray and IH Al–Bahadly, "Sensorless Methods for Determining the Rotor Position of Switched Reluctance Motors", published in the Proceedings of the European Power Electronics Conference, Brighton UK Sep. 13–16, 1993 vol. 6, pp. 7–13.

Anthony J. Champagne, "Correlation of Electric Power Steering Vibration to Subjective Ratings", SAE Technical Paper Series 2000–01–0176, Mar. 6–9, 2000, p. 1–3.

Gallegos–Lopez/Kjaer Miller, "A New Sensorless Method for Switched Reluctance Motor Drives", 1997, Department of Electronics and Electrical Engineering, p. 564–570.

Mvungi/Stephenson, "Accurate Sensorless Rotor Position Detection In An SR Motor", 1991, p. 76–79.

(List continued on next page.)

Primary Examiner—Dang Le
(74) Attorney, Agent, or Firm—Harness, Dickey & Pierce, P.L.C.

(57) ABSTRACT

A fan assembly includes a fan housing and a fan. A switched reluctance fan motor is mounted in an inlet of the fan housing and includes a shaft that is connected to the fan. The switched reluctance fan motor includes a stator with a plurality of circumferentially-spaced stator segment assemblies that include a stator segment core. Winding wire is wound around the stator segment core. A rotor tends to rotate relative to the stator to a rotational position that maximizes the inductance of an energized winding. A drive circuit energizes the winding wire around the stator segment assemblies based on the rotational position of the rotor. End cap assemblies are connected to opposite axial ends of the stator segment core. The end cap assemblies define an annular channel for receiving the winding wire and for preventing winding creep.

11 Claims, 7 Drawing Sheets

U.S. PATENT DOCUMENTS

| | | | |
|---|---|---|---|
| 3,604,222 A | 9/1971 | Sandkrug et al. ............ 310/769 |
| 3,914,859 A | 10/1975 | Pierson ........................ 29/596 |
| 3,979,821 A | 9/1976 | Noodleman .................. 29/598 |
| 3,987,324 A | 10/1976 | Linkous ....................... 310/197 |
| 4,130,770 A | 12/1978 | Wrobel ..................... 310/67 R |
| 4,149,309 A | 4/1979 | Mitsui ........................... 29/596 |
| 4,340,829 A | 7/1982 | McCoy ......................... 310/71 |
| 4,418,307 A | 11/1983 | Hoffmann et al. .......... 318/721 |
| 4,584,495 A | 4/1986 | Kordik ..................... 310/49 R |
| 4,635,349 A | 1/1987 | Rabe ........................... 29/596 |
| 4,698,542 A * | 10/1987 | Muller ..................... 310/67 R |
| 4,772,839 A | 9/1988 | MacMinn et al. .......... 318/696 |
| 4,812,695 A | 3/1989 | Parshall ...................... 310/258 |
| 4,819,460 A | 4/1989 | Obradovic .................. 68/23.7 |
| 4,845,837 A | 7/1989 | Lloyd ........................... 29/598 |
| 4,883,982 A | 11/1989 | Forbes et al. ................. 310/62 |
| 4,896,089 A | 1/1990 | Kliman et al. ............... 318/701 |
| 4,922,165 A | 5/1990 | Crawford et al. ........... 310/215 |
| 4,950,932 A | 8/1990 | Harms et al. ............. 310/67 R |
| 4,953,284 A | 9/1990 | Hammer et al. .............. 29/596 |
| 4,959,596 A | 9/1990 | MacMinn et al. .......... 318/254 |
| 4,998,052 A | 3/1991 | Erdman et al. .............. 318/701 |
| 5,034,642 A | 7/1991 | Hoemann et al. ........... 310/156 |
| 5,076,076 A | 12/1991 | Payne ........................ 68/12.14 |
| 5,161,393 A | 11/1992 | Payne et al. ................ 68/12.04 |
| 5,173,650 A | 12/1992 | Hedlund ...................... 318/701 |
| 5,194,775 A | 3/1993 | Cooper ........................ 310/260 |
| 5,212,419 A | 5/1993 | Fisher et al. ................. 310/254 |
| 5,252,902 A | 10/1993 | Uehara et al. ............... 318/599 |
| 5,256,926 A | 10/1993 | Hagenlocher et al. ...... 310/259 |
| 5,257,828 A | 11/1993 | Miller et al. ............... 180/79.1 |
| 5,301,523 A | 4/1994 | Payne et al. ................ 68/12.16 |
| 5,325,677 A | 7/1994 | Payne et al. ................ 68/12.04 |
| 5,327,053 A | 7/1994 | Mann et al. ................. 318/254 |
| 5,457,375 A | 10/1995 | Marcinkiewicz et al. ... 318/802 |
| 5,467,025 A | 11/1995 | Ray .............................. 324/172 |
| 5,491,859 A | 2/1996 | Richardson .................. 81/159 |
| 5,563,463 A | 10/1996 | Stark ............................ 310/156 |
| 5,578,880 A | 11/1996 | Lyons et al. ............... 310/90.5 |
| 5,583,387 A | 12/1996 | Takeuchi et al. ............ 370/217 |
| 5,589,751 A | 12/1996 | Lim ............................. 318/701 |
| 5,672,925 A | 9/1997 | Lipo et al. ................... 310/154 |
| 5,691,591 A | 11/1997 | McCann ...................... 310/198 |
| 5,701,064 A | 12/1997 | Horst et al. .................. 318/701 |
| 5,720,065 A | 2/1998 | Myers et al. ..................... 8/159 |
| 5,729,072 A | 3/1998 | Hirano et al. ............... 310/258 |
| 5,740,580 A | 4/1998 | Miller ......................... 180/446 |
| 5,743,721 A * | 4/1998 | Graham et al. ............... 310/58 |
| 5,763,978 A | 6/1998 | Uchida et al. ............... 310/215 |
| 5,777,416 A | 7/1998 | Kolomeitsev ............... 310/168 |
| 5,786,651 A | 7/1998 | Suzuki ......................... 310/259 |
| 5,793,179 A | 8/1998 | Watkins ....................... 318/701 |
| 5,806,169 A | 9/1998 | Trago et al. ................. 291/596 |
| 5,811,905 A | 9/1998 | Tang ............................ 310/179 |
| 5,821,661 A | 10/1998 | Wissmach et al. .......... 370/194 |
| 5,859,518 A | 1/1999 | Vitunic ........................ 318/701 |
| 5,877,568 A | 3/1999 | Maes et al. .................. 370/583 |
| 5,883,485 A | 3/1999 | Mehlhorn .................... 318/701 |
| 5,923,141 A | 7/1999 | McHugh ...................... 318/701 |
| 5,929,590 A | 7/1999 | Tang ............................ 318/701 |
| 5,955,861 A | 9/1999 | Jeong et al. ................. 318/701 |
| 5,979,195 A | 11/1999 | Bestell et al. ................. 68/23.2 |
| 5,982,117 A | 11/1999 | Taylor et al. ................ 318/254 |
| 5,990,592 A | 11/1999 | Miura et al. ................. 310/156 |
| 5,994,804 A | 11/1999 | Grennan et al. .......... 310/60 R |
| 5,996,379 A | 12/1999 | Skrippek ....................... 68/140 |
| 6,011,368 A | 1/2000 | Kalpathi et al. ............. 318/434 |
| 6,020,661 A | 2/2000 | Trago et al. ................. 310/43 |
| 6,040,647 A | 3/2000 | Brown et al. ................. 310/89 |
| 6,041,625 A | 3/2000 | Nagai et al. ................ 68/12.08 |
| 6,049,153 A | 4/2000 | Nishiyama et al. ......... 370/156 |
| 6,081,083 A | 6/2000 | Nashiki ....................... 318/254 |
| 6,087,755 A | 7/2000 | Suzuki et al. ............... 310/254 |
| 6,092,619 A | 7/2000 | Nishikawa et al. ......... 180/446 |
| 6,102,151 A | 8/2000 | Shimizu et al. ............. 180/446 |
| 6,104,113 A | 8/2000 | Beifus ....................... 310/68 B |
| 6,107,772 A | 8/2000 | Liu et al. ..................... 318/704 |
| 6,122,579 A | 9/2000 | Collier-Hallman et al. ... 701/41 |
| 6,127,753 A | 10/2000 | Yamazaki et al. ............ 310/71 |
| 6,144,131 A | 11/2000 | Hollenbeck et al. ........ 316/156 |
| 6,166,468 A | 12/2000 | Suzuki et al. ................. 310/90 |
| 6,177,751 B1 | 1/2001 | Suzuki et al. ............... 310/269 |
| 6,188,196 B1 | 2/2001 | Koide et al. ................. 318/700 |
| 6,194,805 B1 * | 2/2001 | Heese et al. ................. 310/166 |
| 6,194,806 B1 | 2/2001 | Suzuki et al. ............... 310/269 |
| 6,204,579 B1 | 3/2001 | Arpino ......................... 310/43 |
| 6,218,753 B1 | 4/2001 | Asano et al. ................ 310/156 |
| 6,219,900 B1 | 4/2001 | Suzuki ......................... 29/598 |
| 6,226,856 B1 | 5/2001 | Kazama et al. ............... 29/596 |
| 6,239,530 B1 * | 5/2001 | Garcia ......................... 310/216 |
| 6,266,591 B1 | 7/2001 | Wilson-Jones et al. ....... 701/41 |
| 6,300,700 B1 | 10/2001 | Nishiyama et al. .... 310/156.45 |
| 6,329,782 B1 | 12/2001 | Chen et al. .................. 318/727 |
| 6,359,412 B1 | 3/2002 | Heglund ...................... 318/701 |
| 6,369,481 B1 * | 4/2002 | Bahn ........................... 310/166 |
| 6,369,687 B1 | 4/2002 | Akita et al. .................. 336/234 |
| 6,373,211 B1 | 4/2002 | Henry et al. ................ 318/432 |
| 6,389,678 B1 | 5/2002 | Ackermann et al. .......... 29/596 |
| 6,487,769 B2 * | 12/2002 | Ketterer et al. ............... 29/596 |
| 2001/0010452 A1 | 8/2001 | Moriarty ...................... 318/700 |
| 2001/0030517 A1 | 10/2001 | Batzel ......................... 318/254 |
| 2002/0089251 A1 | 7/2002 | Tajima et al. ................ 310/216 |

FOREIGN PATENT DOCUMENTS

| | | |
|---|---|---|
| EP | 0967135 A2 | 12/1999 |
| FR | 2719324 | 11/1995 |
| GB | 1200279 | 7/1970 |
| JP | 61030938 | 2/1986 |
| JP | 404049826 A | 2/1992 |
| JP | 05-038086 | 2/1993 |
| JP | 08-033292 | 2/1996 |
| JP | 09084282 | 3/1997 |
| JP | 09-233742 | 9/1997 |
| JP | 09-322439 | 12/1997 |
| JP | 10-174319 | 6/1998 |
| JP | 10-210721 | 8/1998 |
| JP | 10-271718 | 10/1998 |
| JP | 11-018331 | 1/1999 |
| JP | 11-089129 | 3/1999 |
| JP | 11-191987 | 7/1999 |
| JP | 11-275830 | 10/1999 |
| JP | 11-289701 | 10/1999 |
| JP | 11-289726 | 10/1999 |
| JP | 11-289727 | 10/1999 |
| JP | 11-289728 | 10/1999 |
| JP | 11-332138 | 11/1999 |
| JP | 11-341717 | 12/1999 |
| JP | 2000-014057 | 1/2000 |
| JP | 2000-37050 | 2/2000 |
| JP | 2000-139052 | 5/2000 |
| JP | 2000-224790 | 8/2000 |
| JP | 2000-312451 | 11/2000 |
| JP | 2000-333388 | 11/2000 |
| JP | 2001-008395 | 1/2001 |
| RU | 1354-338 A1 | 11/1987 |
| WO | WO 00/37731 | 6/2000 |
| WO | WO 00/79670 A1 | 12/2000 |
| WO | WO 01/95459 A1 | 12/2001 |

OTHER PUBLICATIONS

Roy McCann, "Variable Effort Steering for Vehicle Stability Enhancement Using an Electric Power Steering System", SAE Technical Paper Series 2000-01-0817, Mar. 6-9, 2000, p. 1-5.

Toboldt/Johnson/Olive, "Goodheart-Willcox Automotive Encyclopedia", 1989, p. 577-584.

* cited by examiner

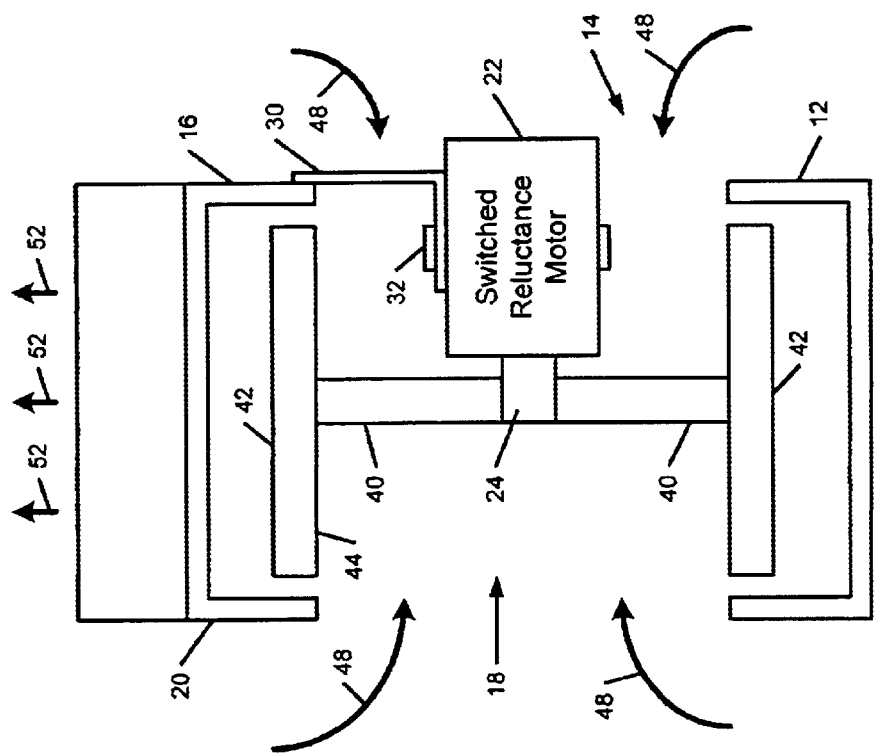
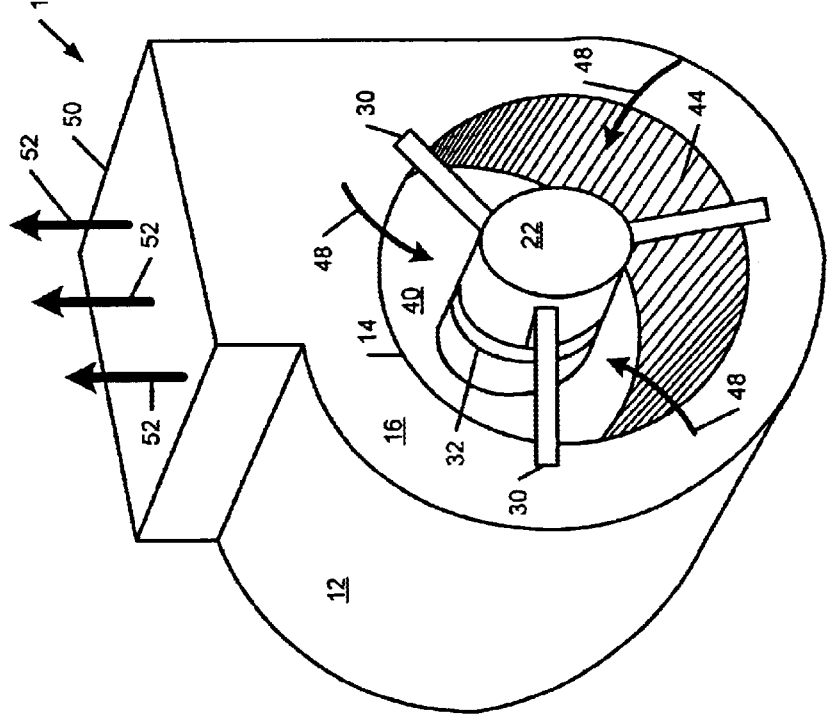
FIG. 1A
FIG. 1B

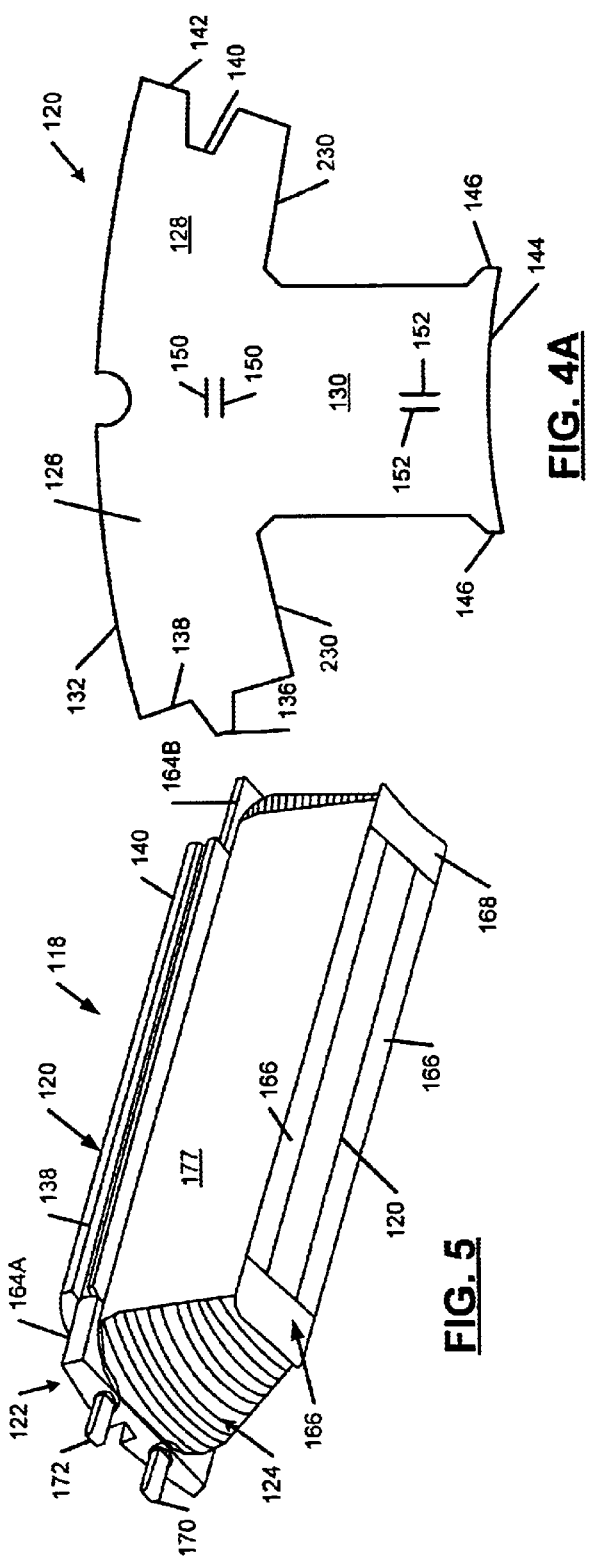
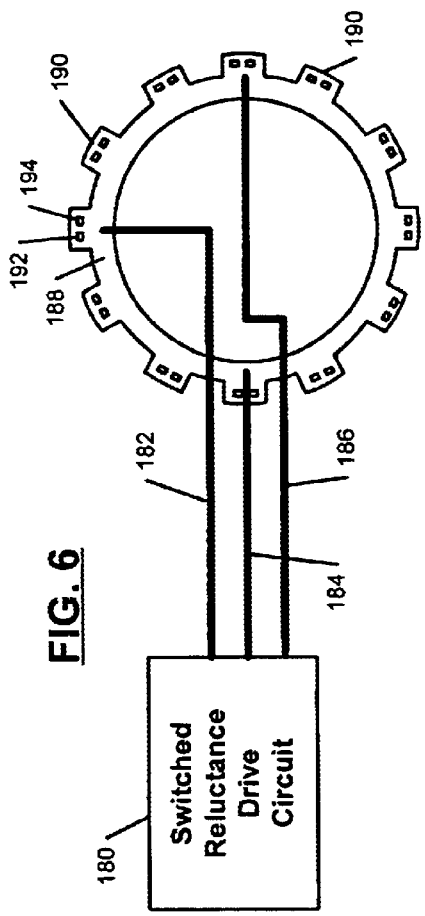

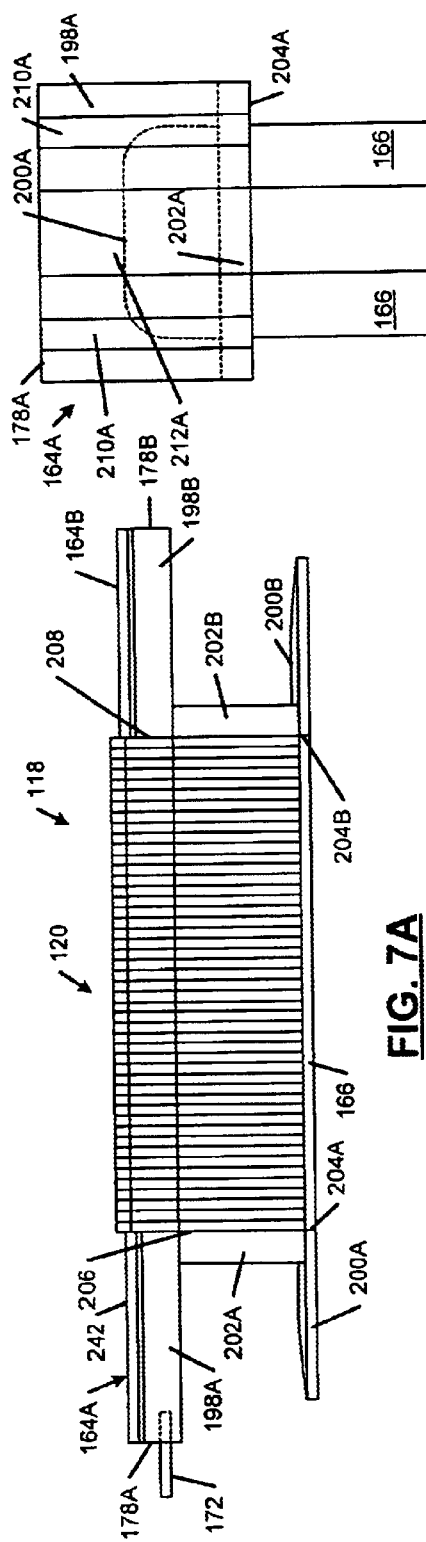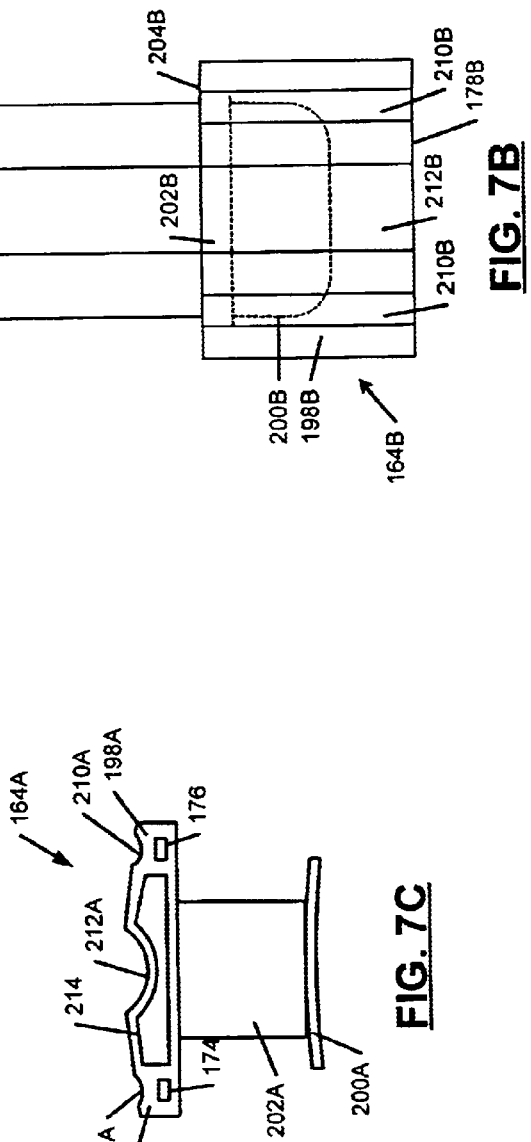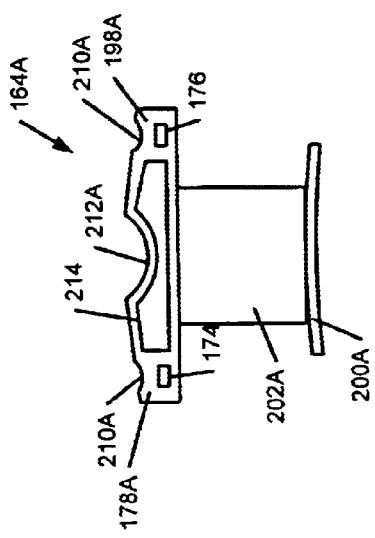

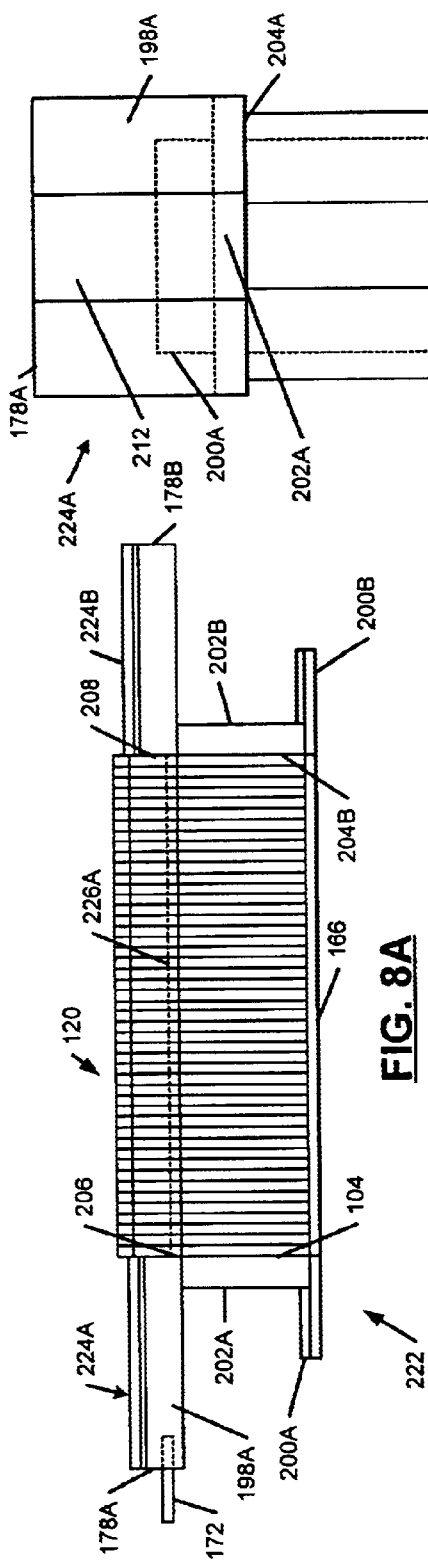
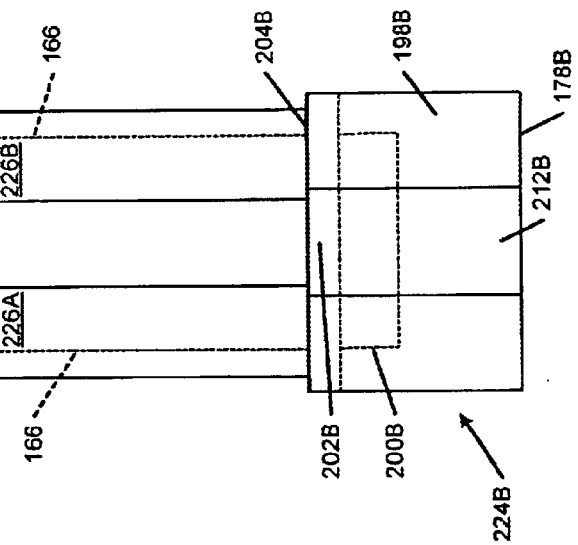
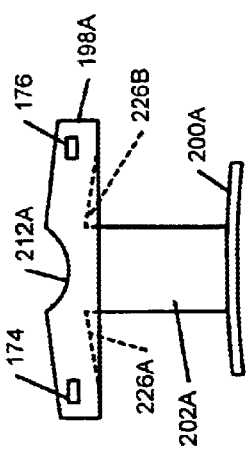

FAN ASSEMBLY INCLUDING A SEGMENTED STATOR SWITCHED RELUCTANCE FAN MOTOR

RELATED APPLICATIONS

This application relates to U.S. patent application Ser. No. 09/817,559, filed Mar. 26, 2001; Ser. No. 09/803,876, filed Mar. 12, 2001; Ser. No. 09/761,125, filed Jan. 16, 2001; Ser. No. 09/824,980, filed Apr. 3, 2001; Ser. No. 09/754,537, filed Jan. 4, 2001; Ser. No. 09/817,687, filed Mar. 26, 2001; and U.S. Pat. No. 6,487,769, issued Dec. 3, 2002.

FIELD OF THE INVENTION

This invention relates to fan assemblies and, more particularly, to a fan assembly including a switched reluctance fan motor with a segmented stator.

BACKGROUND OF THE INVENTION

Fan assemblies are commonly used for moving air and generally include a fan housing, a fan, and a fan motor. There are two main types of fan assemblies. Centrifugal fan assemblies blow air perpendicular to an axis of rotation of the fan and the fan motor. Axial fan assemblies blow air parallel to the axis of rotation of the fan and the fan motor. Axial and centrifugal fan assemblies are typically used in beating, ventilating and air conditioning (HVAC) systems in residential, commercial, and/or industrial applications.

The axial fan assembly typically includes a fan bracket that positions the fan motor relative to the housing. The fan is connected to a shaft of the fan motor. The fan draws air into an inlet of the housing and propels it in an axial direction through the outlet of the fan housing. Because the fan motor is located in the inlet, the size of the fan motor reduces the area of the inlet and the airflow that is provided by the axial fan.

The centrifugal fan assembly includes a fan bracket that mounts the fan in an inlet of the housing. A radial hub connects a shaft of the fan motor to a squirrel cage fan. The centrifugal fan directs the air in a direction that is perpendicular to the axis of the motor. As with the axial fan assembly, the fan motor is located in the inlet, which reduces the area of the inlet and the airflow that is provided by the centrifugal fan.

The fan motors of both types of fan assemblies typically include a rotor with plurality of rotor poles and a stator that includes a plurality of stator poles. The rotor is connected to and rotates with a shaft that is supported by motor bearings. The stationary stator is typically mounted on a radially inner surface of a housing of the fan motor. A drive circuit generates a set of stator currents in winding wire that is wound around the stator poles. The set of stator currents set up a magnetic field that causes the rotor, the shaft and the fan to rotate.

As the fan rotates, it draws air into the inlets that are located on opposite sides of the fan housing. The amount of airflow that can be delivered by the fan assembly is related to the effective area of the inlet and to the speed that the fan rotates. The effective area of the inlet is determined in part by the size of the fan motor. In other words, because the fan motor is mounted in the inlet of both types of fans, the fan motor adversely impacts airflow.

Reluctance motors are conventionally used as fan motors. Reluctance motors produce torque as a result of the rotor tending to rotate to maximize the inductance of an energized winding of the stator. As the energized winding is electrically rotated, the rotor also rotates in an attempt to maximize the inductance of the energized winding of the stator. In synchronous reluctance motors, the windings are energized at a controlled frequency. In switched reluctance motors, control circuitry and/or transducers are provided for detecting the angular position of the rotor. A drive circuit energizes the stator windings as a function of the sensed rotor position. The design and operation of switched reluctance fan motors is known in the art and is discussed in T. J. E. Miller, "Switched Reluctance Electric Motors and Their Control", Magna Physics publishing and Clarendon Press, Oxford, 1993, which is hereby incorporated by reference.

In switched reluctance motors, there are two distinct approaches for detecting the angular rotor position. In a "sensed" approach, an external physical sensor senses the angular position of the rotor. For example, a rotor position tranducer (RPT) with a hall effect sensor or an optical sensor physically senses the angular position of the rotor. In a "sensorless" approach, electronics that are associated with the drive circuit derive the angular rotor position without an external physical sensor. Angular rotor position can be derived by measuring the back electromotive force (EMF) or inductance in unenergized windings, by introducing diagnostic pulses into energized andlor unenergized windings and sensing the resulting electrical response, or by sensing other electrical parameters and deriving rotor angular position.

The stator of conventional switched reluctance motors generally includes a solid stator core or a laminated stator with a plurality of circular stator plates. The stator plates are punched from a magnetically conducting material and that are stacked together. The solid core or the stack of stator plates define salient stator poles that project radially inward and inter-polar slots that are located between the adjacent stator poles. Winding wire is wound around the stator poles. Increasing the number of winding turns and the slot fill increases the torque density of the electric machine. The stator poles of switched reluctance motors typically have parallel sides that do not inherently hold the winding wire in position. Tangs on radially inner ends of the stator poles have been provided to help maintain the winding wire on the stator poles with some limited success. Tangs limit an area between radially inner ends of the stator poles, which may cause problems during the winding process.

In switched reluctance fan motors using the "sensed" approach, a rotor position transducer ("RPT") is used to detect the angular position of the rotor with respect to the stator. The RPT provides an angular position signal to the drive circuit that energizes the windings of the switched reluctance fan motor. The RPT typically includes a sensor board with one or more sensors and a shutter that is coupled to and rotates with the shaft of the rotor. The shutter includes a plurality of shutter teeth that pass through optical sensors as the rotor rotates.

Because rotor position information is critical to proper operation of a switched reluctance motor, sophisticated alignment techniques are used to ensure that the sensor board of the RPT is properly positioned with respect to the housing and the stator. Misalignment of the sensor board is known to degrade the performance of the electric motor. Unfortunately, utilization of these complex alignment techniques increases the manufacturing costs for switched reluctance motors equipped with RPTs.

The RPTs also increase the overall size of the switched reluctance motor, which can adversely impact motor and product packaging requirements. The costs of the RPTs and their related manufacturing costs often place switched reluctance motors at a competitive disadvantage in applications that are suitable for open-loop induction electric motors that do not require RPTs.

Another drawback with RPTs involves field servicing of the switched reluctance motors. Specifically, wear elements, such as the bearings, located within the enclosed rotor housing may need to be repaired or replaced. To reach the wear elements, an end shield must be removed from the housing. Because alignment of the sensor board is critical, replacement of the end shield often requires the use of complex realignment techniques. When the service technician improperly performs the alignment techniques, the motor's performance is adversely impacted.

In an effort to eliminate the RPTs and to reduce manufacturing costs and misalignment problems, the "sensorless" approach for sensing rotor position is used. The various methods of performing the "sensorless" approach have drawbacks that are attributable, in part, to variations in the inductance and resistance of the stator windings due to assembly and tolerance variations.

Fan assemblies incorporating switched reluctance motors can be improved in several important areas. Specifically, it is desirable to improve the torque density of switched reluctance motors that are used in fan assemblies. By increasing the torque density of the fan motor, the size of the fan motor can be reduced for a given torque density and/or the size can be maintained with an increase in torque density. As a result, the fan motor can rotate the fan faster for a given fan motor dimension or the fan motor dimensions can be reduced to increase the effective size of the fan inlet opening.

It is also desirable to eliminate the need for RPTs in switched reluctance motors that are used in fan assemblies. It is also desirable to assemble the stator of a switched reluctance motor in a highly uniform and repeatable manner to improve the performance of sensorless switched reluctance motors by reducing variations in the inductance and resistance of the stator. As a result, the "sensorless" methods of sensing rotor position will be improved.

SUMMARY OF THE INVENTION

A fan assembly according to the invention includes a fan housing, a fan that is rotatably mounted in the fan housing, and a switched reluctance fan motor that rotates the fan. The switched reluctance fan motor includes a segmented stator having a plurality of stator segment assemblies. The stator segment assemblies define salient stator poles and interpolar stator slots. Each of the stator segment assemblies includes a stator segment core, an end cap assembly attached to opposite axial end faces of the stator segment core, and winding wire that is wound around the stator segment core and the end cap assembly. The rotor defines a plurality of rotor poles. The rotor tends to rotate relative to the stator to maximize the inductance of an energized winding. A drive circuit energizes the winding wire around the stator segment assemblies based on a rotational position of the rotor.

According to other features of the invention, the fan is an axial fan or a squirrel cage fan. Each stator plate has an outer rim section and a tooth-shaped pole section. The end cap assembly includes a pair of end caps that are secured to opposite ends of the stator segment core, and a pair of retainer plates interconnecting the end caps on opposite sides of the stator segment core. The end cap assembly defines an annular retention channel within which the winding wire is wound. The retention channel facilitates improved precision in the winding process and tends to reduce winding creep during use.

The fan assembly according to the present invention includes a switched reluctance fan motor with improved torque density. As a result, the torque output of the switched reluctance fan motor can be increased for increased airflow without increasing the dimensions of the fan motor. Alternatively the fan motor dimensions can be reduced for a given airflow to reduce the weight and the dimensions of the fan assembly. In addition, the stator segment assemblies can be manufactured with greater uniformity and with lower variations in inductance and resistance. As a result, sensorless rotor position sensing techniques can be employed more readily, which dramatically lowers the manufacturing costs of the switched reluctance fan motor and improves the reliability of the fan motor in the field.

Other objects, features and advantages will be apparent from the specification, the claims and the drawings.

BRIEF DESCRIPTION OF THE DRAWINGS

FIG. 1A is a perspective view of a first fan assembly including a fan housing, a squirrel cage fan, and a switched reluctance fan motor;

FIG. 1B is a partial sectional view of the fan assembly of FIG. 1A;

FIG. 4A illustrates a stator plate;

FIG. 5 is a perspective view of a stator segment assembly associated with the stator;

FIG. 6 illustrates a switched reluctance drive circuit and a circuit board for connecting the drive circuit to terminals of the stator segment assemblies;

FIG. 7A shows the stator segment assembly with its wire windings and insulation removed to better illustrate a stack of stator plates and the end cap assembly;

FIG. 7B is a plan view of the end cap assembly shown in FIG. 7A;

FIG. 7C is an end view of the end cap assembly shown in FIG. 7B;

FIG. 8A is similar to FIG. 7A except that an alternate end cap assembly is shown;

FIG. 8B shows a plan view of the alternate end cap assembly of FIG. 8A; and

FIG. 8C illustrates an end view of the alternate end cap assembly shown in FIG. 8B.

DETAILED DESCRIPTION OF THE PREFERRED EMBODIMENTS

Figures 2A, 2B:
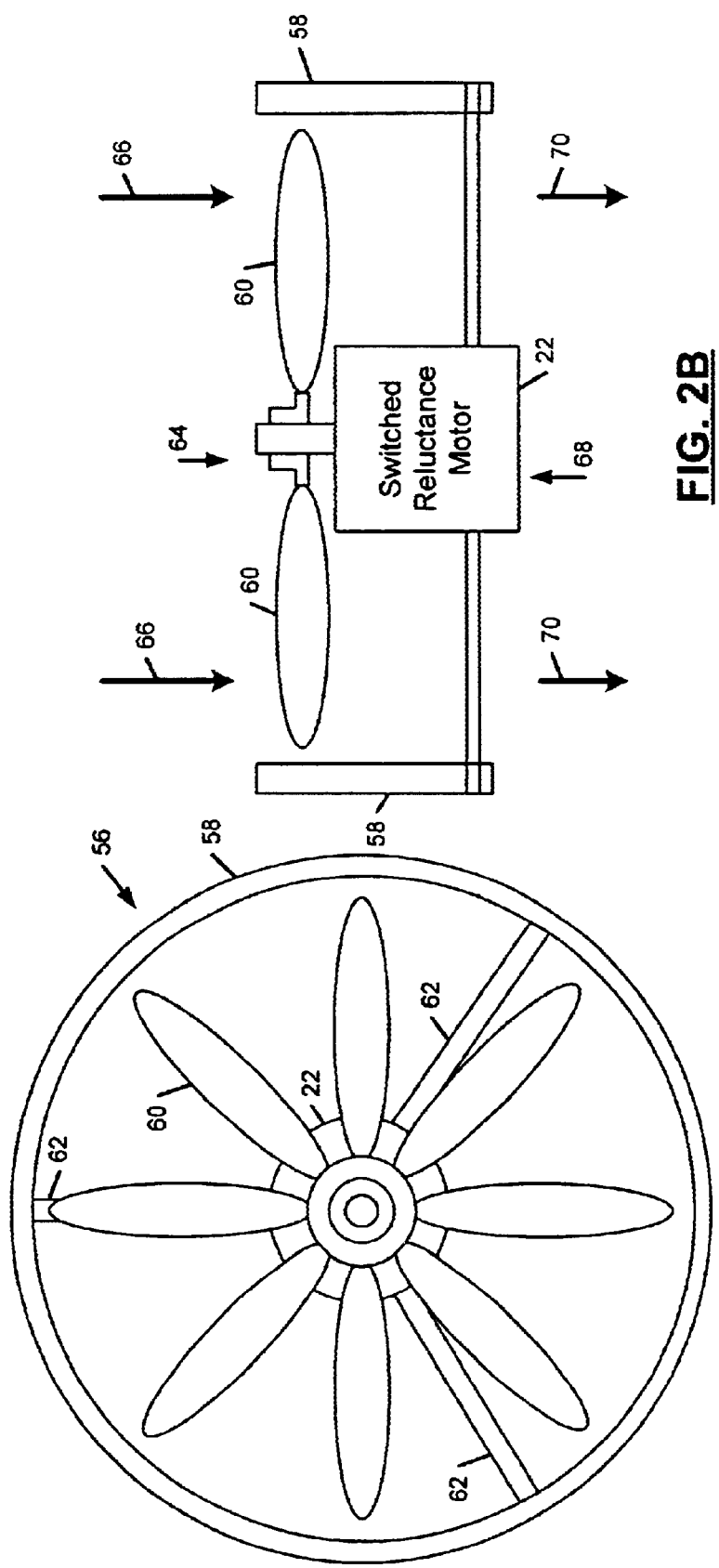
FIG. 2A is a plan view of a second fan assembly including a fan housing, an axial fan, and a switched reluctance fan motor.
FIG. 2B is a partial sectional view of the second fan assembly of FIG. 2A.

The following detailed description provides preferred exemplary embodiments only and is not intended to limit the scope, applicability or configuration of the present invention. Rather, the detailed description of the preferred exemplary embodiments will provide those skilled in the art with an enabling description for implementing the preferred exemplary embodiments of the present invention. It will be understood that various changes may be made in the function and arrangement of the elements without departing from the spirit and scope of the invention as set forth in the appended claims.

A fan assembly according to the present invention includes a novel switched reluctance fan motor with a segmented stator. The fan assembly with the switched reluctance fan motor can be packaged in a smaller size for a given torque output and/or packaged at the same size with increase torque output. The efficiency of the fan assembly can be improved through an increased effective inlet opening area that allows additional airflow. Alternately, the size of the fan assembly can be reduced for a given airflow. The novel segmented stator switched reluctance fan motor can also be implemented using sensorless rotor position techniques while remaining cost competitive with other types of fan motors.

Referring now to FIGS. 1A and 1B, a first fan assembly 10 includes a fan housing 12 with a first inlet 14 on a side surface 16. A second inlet 18 is located on an opposite side surface 20. A switched reluctance fan motor 22 is mounted centrally in the first inlet 14. The switched reluctance fan motor 22 includes a shaft 24 that is supported by motor bearings (not shown). Bracket arms 30 are connected to a circular bracket portion 32 that is attached to the switched reluctance fan motor 22. The bracket arms 30 are connected to edges of the side surface 16 of the fan housing 12 adjacent to the first inlet 14. The bracket arms 30 and the circular bracket portion 32 support the switched reluctance fan motor 22 approximately centrally in the first inlet 14. The shaft 24 of the switched reluctance fan motor 22 is also connected to a radially inner surface of an annular hub 40. A radially outer surface of the annular hub 40 is connected to a squirrel cage fan 42. The squirrel cage fan 42 includes a plurality of fan blades 44.

The switched reluctance fan motor 22 rotates the squirrel cage fan 42 to draw air through the first inlet 14 and/or the second inlet 18 as indicated by arrows 48 and into the fan housing 12. The squirrel cage fan 42 propels the air through an outlet 50 of the fan housing 12 in a direction that is indicated by arrows 52. The outlet 50 of the fan housing 12 is typically connected to a duct system (not shown) that delivers the air to one or more remote locations.

Referring now to FIGS. 2A and 2B, a second fan assembly 56 is shown and includes a fan housing 58, an axial fan 60, a fan bracket 62 and the switched reluctance fan motor 22. The switched reluctance fan motor 22 rotates the axial fan 60 to draw air through an inlet 64 as indicated by arrows 66 and to propel the air through an outlet 68 as indicated by arrows 70.

Referring now to the remaining drawings, the switched reluctance fan motor 22 is shown to include a housing 112, a segmented stator 114 mounted in the housing 112, and a rotor 116 supported for rotation relative to the segmented stator 114. In accordance with the present invention, the segmented stator 114 includes a plurality of stator segment assemblies 118 that can be individually assembled and subsequently combined with other stator segment assemblies to provide the segmented stator 114. As will be detailed, each stator segment assembly 118 includes a stator segment core 120, an end cap assembly 122 attached to the stator segment core 120, and winding wire 124 that is wound around the stator segment core 120 and the end cap assembly 122.

Figure 3:
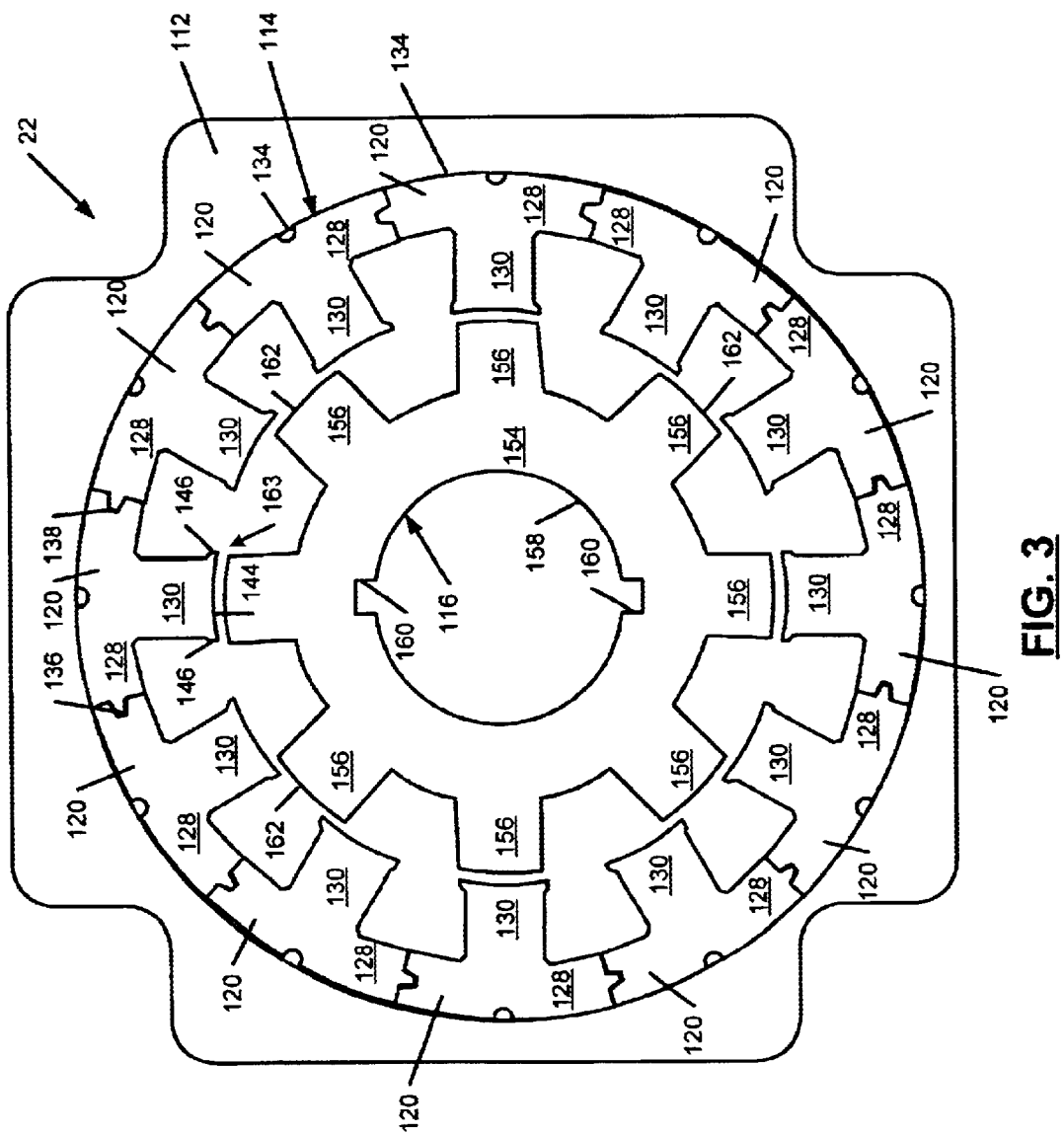
FIG. 3 illustrates a segmented stator and rotor for a switched reluctance fan motor.
Figure 4B:
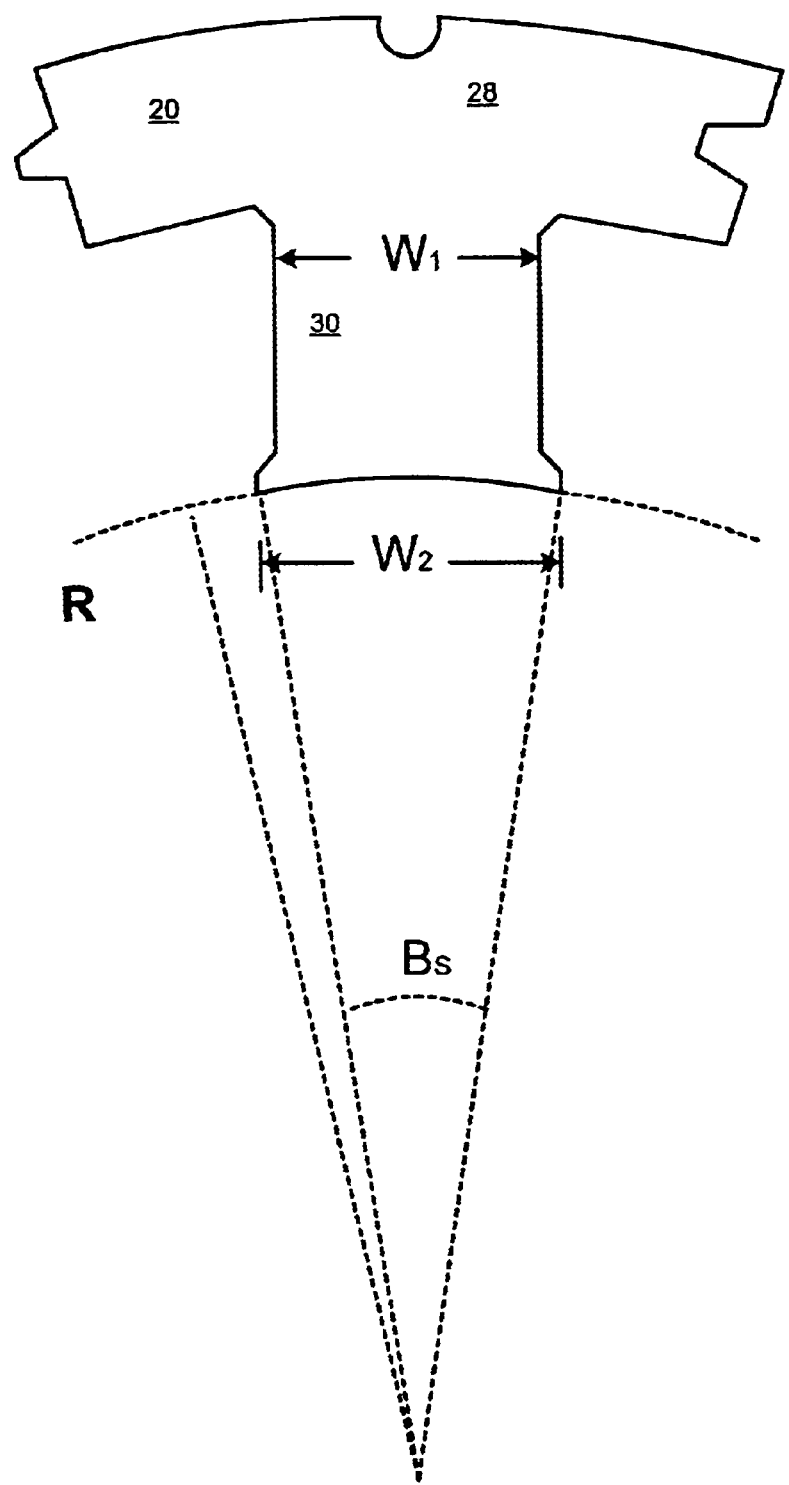
FIG. 4B identifies tooth width, projection width and stator pole arc on the stator plate of FIG. 4A.

Referring primarily to FIGS. 3, 4A and 4B, the stator segment core 120 includes a solid core and/or a stack of individual stator plates 126. Each stator plate 126 includes an arcuate outer rim section 128 and a tooth-shaped pole section 130. An outer edge surface 132 of the outer rim section 128 is shaped for mounting to an inner wall surface 134 of the housing 112. Each outer rim section 128 has a tongue projection 136 formed on one edge surface 138 and a groove 140 on its opposite edge surface 142. This tongue and groove arrangement helps align the stator segment assemblies during manufacturing. The tongue and groove arrangement, however, can be omitted because the press fit assembly provides sufficient alignment. Each pole section 130 of the stator plates 126 has an arcuate inner edge surface 144 and a pair of circumferentially-extending projections 146 or tangs.

As previously mentioned, the stator segment core 120 is defined by a plurality of stator plates 126 that are stacked together. The stator plates 126 are die cut from thin sheets of magnetically conductive material. During the die cutting operation, a first pair of slits 150 are cut into the outer rim section 120, a second pair of slits 152 are cut into the pole section 130 and central portions between the slits are deformed. The slits 150 are transverse in alignment relative to the slits 152. The stator plates 126 are stacked and press fit to form the stator segment core 120. This operation results in the stator plates 126 being releasably interconnected to define the stator segment core 120.

The rotor 116 is shown to include a circular rim section 154 and a plurality of tooth-shaped pole sections 156 that project radially from the rim section 154. A circular bore 158 is formed in the rotor 116 and includes keyways 160. A rotor shaft (not shown) is received by the circular bore 158 of the rotor 116. In the particular embodiment shown, the rotor 116 has eight equally-spaced rotor pole sections 156 and the segmented stator 114 has twelve equally-spaced pole sections 130. Other rotor pole and stator pole combinations are also contemplated In addition, each rotor pole section 156 has an arcuate outer edge surface 162 that defines an air gap 163 with respect to the arcuate inner edge surface 144 on the pole sections 130 of the stator plates 126.

Referring to FIG. 4B, tooth width W1, projection width W2, and stator pole arc Bs are shown. As a result of segmenting the stator, the designer of the switched reluctance electric machine has greater flexibility in designing the dimensions of the stator segment assemblies. The slot opening dimension between radially inner ends of the stator teeth restricts the projection width W2 when needle and transfer winding methods are employed. This restriction is eliminated when the segmented stator assemblies are employed because the stator teeth can be wound individually before being assembled into the stator.

The tooth width W1 determines the magnetic flux density in the stator tooth and how much area is available for winding wire in the inter-polar stator slot. The designer of the switched reluctance electric machine can select the tooth width W1 so that it is sufficient to accommodate the maximum anticipated magnetic flux in the stator poles, but is not wider than necessary. By optimizing the tooth width W1, the slot area is increased, which allows additional winding wire. By increasing the current carrying capacity of the windings without causing overheating, the torque density of the switched reluctance electric machine can be improved. The design of the stator plates also depends on other factors such as the type of steel that is selected, the axial length of the stator stack, the operating speed, the overall size of the motor, and the desired magnetic flux density in the stator teeth.

Referring to FIG. 5, the stator segment assembly 118 is shown fully assembled to include the stator segment core 120, the end cap assembly 122 and the winding wire 124. The end cap assembly 122 is preferably made from magnetically permeable material and includes a first end cap 164A, a second end cap 164B and a pair of elongated winding retainer sections 166. The first end cap 164A is located at one end of the stator segment core 120 and the second end cap 164B is located at the opposite end of the stator segment core 120. The winding retainer sections 166 interconnect the first and second end caps 164A and 164B and are located adjacent to the projections 146 near the radially inner end of the pole sections 130 of the stator plates 126. Preferably, the end caps 164A and 164B are similar in configuration. Likewise, it is preferable that the retainer sections 166 are similar in configuration. Snap-in connections are contemplated for connecting the opposite ends of each retainer section 166 to the end caps 164A and 164B. Additionally, it is contemplated that adhesives are used for bonding the end caps 164A and 164B to the opposite ends of the stator segment core 120. The end caps 164A and 164B and the retainer sections 166 can also be molded as an integral end cap assembly 122. Since the first end cap 164A is similar to the second end cap 164B, the following description of the components will use reference numerals with an "A" suffix for the first end cap 164A and the reference numerals for sir components of the second end cap 164B will be identical with a "B" suffix.

Terminals 170 and 172 are shown in FIGS. 5 and 7A to be mounted in slots 174 and 176 (FIG. 7C) formed in an end surface 178A of the first end cap 164A. One end of the winding wire 124 is connected to the first terminal 170 while an opposite end of the winding wire 124 is connected to the second terminal 172. Insulating material 177 is shown to be positioned to cover winding wire 124 on both lateral sides of stator core 120. The insulating material 177 is also positioned (but not shown) between the stator segment core 120 and the winding wire 124.

Referring to FIG. 6, a switched reluctance drive circuit 180 is shown connected via connecting wires 182, 184 and 186 to a printed circuit board 188. The printed circuit board 188 is circular and has a plurality of radially outwardly projecting terminal pads 190. Each terminal pad 190 has conductive terminal slots 192 and 194 arranged to accept installation of the terminals 170 and 172 for each stator segment assembly 118. The drive circuit 180 operates to control energization of the winding wire 124 of the stator segment assemblies 118. In a preferred embodiment, the switched reluctance drive circuit 180 senses rotor position using sensorless techniques that are disclosed in U.S. Pat. No. 5,929,590 to Tang and U.S. Pat. No. 5,877,568 to Maes, et al., which are hereby incorporated by reference, or using any other conventional sensorless techniques.

To more clearly illustrate the structure of the end cap assembly 122, FIG. 7A shows the stator segment assembly 118 prior to the winding wire 124 being wound thereon. The first end cap 164A includes an outer section 198A and an inner section 200A interconnected by a hub section 202A, all defining a common face surface 204A. The face surface 204A abuts and is bonded to an axial end surface 206 of the stator segment core 120. Similarly, the face surface 204B of second end cap 164B abuts and is bonded to an end surface 208 of the stator segment core 120. When the first end cap 164A is secured to the stator segment core 120, its outer section 198A extends slightly radially inward with respect to the outer rim section 128 and is parallel to the outer rim section 128. The hub section 202A is aligned with pole section 130 and the inner section 200A is aligned with and extends laterally beyond the inner edge surface 144 and the projections 146. A similar alignment is provided when the second end cap 164B is secured to the opposite end surface 208 of the stator segment core 120. Moreover, the width of hub sections 202A and 202B is less than or equal to the width of the pole sections 130 of the stator segment core 120. The opposite ends of the retainer sections 166 are connected to the face surfaces 204A and 204B of the end caps 164A and 164B, respectively, adjacent to their inner sections 200A and 200B. As such, the end cap assembly 122 defines a continuous annular channel within which the winding wire 124 can be precisely installed and maintained.

FIG. 7B shows the inner section 200A of the first end cap 164A and the inner section 200B of the second end cap 164B to be rectangular in shape. It is contemplated, however, that other configurations (i.e. semi-circular, square, tapered, etc.) could be used. As a further option, the retainer sections 166 could be provided as a cantilevered section that is integrally formed with the end caps 164A and/or 164B and adapted for connection to the inner section of the opposite end cap. To reduce the weight of the end cap assembly 122, lateral axial grooves 210 and a central axial groove 212 can be formed on the outer section of the end caps 164A and 164B. Likewise, a cavity 214 can also be formed to provide additional weight reduction.

Referring now to FIGS. 8A, 8B and 8C, an alternative cap assembly 222 is shown for connection to the stator segment core 120 and supporting the winding wire 124. Reference numerals from FIGS. 7A, 7B and 7C will be used where appropriate to identify similar elements. Specifically, the first end cap 224A is generally similar to the first end cap 164A. The alternative end cap assembly 222 includes an additional pair of retainer sections. An outer retainer section 226A extends axially from the common face surface 204A adjacent to the outer section 198A for connection to the outer section 198B of the second end cap 224B. An outer retainer section 226B likewise extends axially from its common face surface 204B for connection to common face surface 204A of first end cap 224A. The outer retainer sections 226A and 226B provide additional support for the end cap assembly 122. The outer retainer sections 226A and 226B have a tapered profile to mate with the profile of inner wall surfaces 230 (FIG. 2) of the outer rim section 128.

As can be appreciated from the foregoing, the switched reluctance fan motor according to the invention has improved torque density. For a given fan housing and inlet size, the fan motor provides improved airflow by reducing the amount of the inlet opening that is obstructed by the fan motor. The stator segment assemblies in the fan motor can be produced with a greater electrical uniformity and with lower variations in inductance and resistance. As a result, sensorless rotor position sensing techniques can be employed, which dramatically lowers the manufacturing costs of the fan assembly and improves reliability in the field. Because the manufacturing tolerances of the stator segments have been improved, less costly drive circuits can be employed and/or more accurate control can be achieved. In addition, the end cap assemblies according to the invention prevent winding creep and further help improve uniformity of the stator segment assemblies during use.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to the skilled practitioner upon a study of the drawings, the specification and the following claims.

What is claimed is:

1. A fan assembly comprising:

a fan including a fan housing with an inlet and an outlet; and a switched reluctance fan motor mounted in said fan housing that includes:

a shaft that is connected to said fan;

a stator including a plurality of circumferentially-spaced stator segment assemblies each including a stator segment core defining a single stator pole and winding wire wound around said stator segment core;

a rotor that is connected to said shaft and that defines a plurality of rotor poles, wherein said rotor tends to rotate relative to said stator to a rotational position that maximizes the inductance of an energized winding; and a drive circuit that energizes said winding wire around said stator segment assemblies based on said rotational position of said rotor using sensorless techniques.

2. The fan assembly of claim 1 wherein said fan is an axial fan.

3. The fan assembly of claim 1 wherein said fan is a squirrel cage fan.

4. The fan assembly of claim 1 wherein said stator segment core includes stator plates with a radially outer rim section and a tooth section that extends radially inwardly from a center portion of said radially outer rim section.

5. The fan assembly of claim 4 further comprising:

an insulation layer located between said winding wire and said stator segment core.

6. The fan assembly of claim 4 further comprising:

projections extending from opposite sides of a radially inner end of said tooth section.

7. The fan assembly of claim 6 further comprising:

first and second end caps connected to opposite axial ends of said stator segment core; and first and second end cap retainer sections that extend along said projections and that connected said first and second end caps, wherein said first and second end caps and said first and second end cap retainer sections reduce movement of said winding wire during use.

8. The fan assembly of claim 6 wherein said projections have a width W2 that is greater than a width of said tooth section W1.

9. The fan assembly of claim 4 wherein said stator plates of said stator segment core include radial and lateral slits and first and second central portions that are deformed using a punch to hold said stack of stator plates together.

10. The fan assembly of claim 1 further comprising an end cap assembly including first and second end caps connected to axial ends of said stator segment core and a first end cap retainer section that extends along said projections and that connects said first and second end caps, wherein said winding wire is wound around said first and second end caps and said stator core, and wherein said end cap assembly is not located between radial side surfaces of said tooth section and said winding wire.

11. The fan assembly of claim 10 wherein said end cap assembly further includes a second end cap retainer section that extends along said projections and that connects said first and second and caps.

* * * * *

UNITED STATES PATENT AND TRADEMARK OFFICE
CERTIFICATE OF CORRECTION

PATENT NO.     : 6,700,284 B2
DATED          : March 2, 2004
INVENTOR(S)    : Donald J. Williams et al.

It is certified that error appears in the above-identified patent and that said Letters Patent is hereby corrected as shown below:

Column 1,
Line 27, "beating" should be -- heating --.

Column 2,
Line 24, "andlor" should be -- and/or --.

Column 6,
Line 34, after "contemplated" insert -- . --.

Column 7,
Line 25, "sir" should be -- similar --.

Column 10,
Line 8, "connected" should be -- connect --.
Line 22, after "to" insert -- opposite --.
Line 32, after "second", "and" should be -- end --.

Signed and Sealed this

Twenty-fourth Day of May, 2005

JON W. DUDAS
*Director of the United States Patent and Trademark Office*